United States Patent [19]

Sakaguchi et al.

[11] 4,219,748
[45] Aug. 26, 1980

[54] ELECTRICAL MACHINE STATOR AND MANUFACTURING METHOD THEREFOR

[75] Inventors: Yukinobu Sakaguchi, Osaka; Tomiaki Sakano, Hirakata; Junichi Hirata, Mino, all of Japan

[73] Assignee: Matsushita Electric Industrial Co., Ltd., Osaka, Japan

[21] Appl. No.: 886,038

[22] Filed: Mar. 13, 1978

Related U.S. Application Data

[63] Continuation of Ser. No. 658,663, Feb. 17, 1976, abandoned.

[30] Foreign Application Priority Data

| Feb. 19, 1975 | [JP] | Japan | 50-21187 |
| Feb. 19, 1975 | [JP] | Japan | 50-21188 |
| Feb. 19, 1975 | [JP] | Japan | 50-21189 |
| Feb. 19, 1975 | [JP] | Japan | 50-21190 |
| Feb. 19, 1975 | [JP] | Japan | 50-21191 |
| Mar. 19, 1975 | [JP] | Japan | 50-34053 |
| May 20, 1975 | [JP] | Japan | 50-60785 |

[51] Int. Cl.$^2$ ............................................. H02K 11/00
[52] U.S. Cl. ................................ 310/71; 310/260; 310/271
[58] Field of Search ............... 310/71, 43, 45, 260, 310/194, 271; 174/138 E; 336/192; 339/276 R

[56] References Cited

U.S. PATENT DOCUMENTS

| 2,999,962 | 9/1961 | Wahl | 336/192 |
| 3,443,256 | 5/1969 | Holton | 336/192 |
| 3,474,531 | 10/1969 | Slenker | 336/192 |
| 3,912,957 | 10/1975 | Reynolds | 310/71 |
| 3,974,407 | 8/1976 | Dochterman | 310/71 |

FOREIGN PATENT DOCUMENTS

| 1763353 | 8/1971 | Fed. Rep. of Germany | 310/71 |
| 2320865 | 10/1973 | Fed. Rep. of Germany | 310/71 |

*Primary Examiner*—R. Skudy
*Attorney, Agent, or Firm*—Wenderoth, Lind & Ponack

[57] ABSTRACT

The present invention is a stator terminal construction for use in a rotary electrical machine such as an electric motor. The coil element of the stator coil is inserted in an iron core and a coil end of the coil element extends outwardly from a corresponding end of the core. This coil end has coil winding ends extending out of it and connected to lead wires for an external power source. The terminal structure is constituted by a block of moldable resin positioned directly on the coil end having the connections between the coil winding ends and the lead wires embedded therein. The terminal structure thus serves to insulate and fix the connections between the coil winding ends and the lead wires.

1 Claim, 28 Drawing Figures

ELECTRICAL MACHINE STATOR AND MANUFACTURING METHOD THEREFOR

This is a continuation of application Ser. No. 658,663, filed Feb. 17, 1976 now abandoned.

The present invention relates to an electrical machine, and more particularly to a stator of a rotary electrical machine such as an electric motor and manufacturing methods therefor.

Conventionally, in the manufacture of a stator for an electrical machine, for example, an electric motor stator having a construction as shown in FIGS. 1 to 3, in which FIG. 1 shows a perspective view of an electric motor stator produced by the conventional method and FIG. 2 is a fragmentary view showing a cross section of an important portion of the stator s of FIG. 1, while FIG. 3 is a side elevational view showing, on an enlarged scale, connections between coil winding ends and lead wires of the stator of FIG. 1, there are involved various troublesome processes in which a main stator coil c inserted into an iron core I by an inserter machine or inserting apparatus (not shown) is temporarily shaped by a primary shaping machine (not shown) with insulating materials (not shown) being laid between phases of the stator coil windings c, after which auxiliary coil windings (not shown) are further inserted into the iron core I by the inserter machine. Subsequently, the main stator coil c thus inserted into the iron core I is further shaped by a secondary shaping machine (not shown), with sleeves (not shown) being inserted at predetermined positions of the winding ends ce of the stator coil c and the wires for connecting the poles of the same stator coil, after which the winding ends ce of the main stator coil c are cut to predetermined lengths and temporarily secured at predetermined positions on a coil end cf of the main stator coil c by tying threads (not shown). Thereafter, another shaping is provided at the portion r between the coil end cf and the iron core I, whereat the coil end cf rises from the iron core I, for eliminating any loose windings of the coil c, with the coil end is bound at several places by tying threads y for being fixed. Subsequently, the coil winding ends ce are connected to lead wires 1 by soldering, with the soldered connections j being covered by varnished insulating tubes u as shown, after which the connections j are positioned against a predetermined portion of the coil end cf through an insulating film i for being temporarily secured thereto by tying threads (not shown). The stator coil c is further subjected to a final shaping by a third shaping machine (not shown) for forming the coil end cf into predetermined dimensions, with the connections j between the coil winding ends ce and the lead wires 1 being rigidly secured at the predetermined position on the coil end cf by the tying threads y'. The stator coil c thus arranged in the iron core I is then transferred into a varnish treating process (not shown), whereat the stator coil c, together with the tying thread y and y' and insulating materials i etc., are impregnated with varnish, with subsequent drying and hardening for fixing the coil c in a predetermined shape and strengthening the insulation thereof, whereby the electric motor stator s is finished.

The conventional manufacturing process of the stator described above may be summarized as follows:

(a) insertion of main stator coil into the iron core by the inserter machine; (b) primary shaping of the main stator coil by the shaping machine; (c) insertion of inter-phase insulating paper; (d) insertion of the auxiliary coil into the iron core by the inserter machine; (e) secondary shaping of the main stator coil by the shaping machine (f) insertion of sleeves onto the stator coil winding ends and connecting wires between poles; (g) temporary fixing of the stator coil winding ends; (h) shaping of the stator coil winding ends; (i) binding of the stator coil winding ends with tying threads by the lacing machine; (j) peeling off of the covering for the stator coil winding ends; (k) connection of lead wires to the stator coil winding ends (l) insulation of the connections between the stator coil winding ends and the lead wires; (m) temporarily fixing the insulated connections to the stator coil end; (n) a third shaping; (o) securing of the insulated connections to the stator coil end; (p) impregnation of the stator coil with varnish; (q) drying and hardening of the varnish.

In the conventional manufacturing process of the electric motor stator as described above, various attempts have been made to rationalize certain steps, particularly the coil insertion and winding process and the varnish treating process. For example, in the coil insertion and winding process, much progress has recently been made by wide employment of the inserter machines for inserting coils into the iron core of the stator, while in the varnish treating process, conventional drying which takes a relatively long period of time has been replaced by a quick drying which employs a drip impregnation method, so that time for semi-finished products are required to stay in one stage of the process is appreciably reduced. The improved manufacturing process as described above, however, has various disadvantages in that the varnishing process constitutes the greater part of the manufacuring cost as ever, while in the steps of shaping the stator coil c after insertion thereof into the iron core I and for insulating and fixing the connections j between the coil winding ends ce and the lead wires l, much manual labor is still required, and consequently further rationalization of such processes is difficult so long as the conventional procedures are continuously employed.

Accordingly, an essential object of the present invention is to provide an improved electrical machine stator and a manufacturing method therefor in which the steps of fixing the coil winding ends of a stator and for insulating and fixing connections between stator coil winding ends and lead wires are rationalized for simplification through formation of bands and a terminal structure of moldable resinous material at predetermined positions on the stator coil end, while the varnishing process for the stator coil is dispensed with, with substantial elimination of the disadvantages inherent in the conventional electrical machine stators and manufacturing methods thereof.

Another important object of the present invention is to provide an electrical machine stator of the above described type and a manufacturing method therefor in which the shape of the terminal structure and the attachment thereof onto the stator coil end are so arranged as to achieve rationalization of the process for insulating and fixing the connections between stator coil winding ends and lead wires in an efficient manner.

A further object of the present invention is to provide an electrical machine stator of the above described type in which the connections between stator coil winding ends and lead wires are perfectly protected against deterioration for preventing reduction of stator insulation during use of the electrical machines in a humid atmosphere.

A still further object of the present invention is to provide a manufacturing method for an electrical machine stator of the above described type, in which method an electrical machine stator having a stable function can be produced by a simplified processes at a low manufacturing cost.

According to a preferred embodiment of the present invention, the coil winding end of a stator coil clamped so as to have predetermined dimensions within shaping molds is fixed or set to predetermined dimensions by the injection of moldable resin into the same molds, while a terminal structure for forming the connections between the coil winding ends and lead wires is simultaneously formed on the coil end with the same moldable resin, which terminal structure is provided, on the outer prepheral surface thereof, with a plurality of grooves for receiving therein the connections between the coil winding ends and lead wires. The grooves are subsequently filled by application of fused hot-melt resin thereinto, and before the holt-melt resin solidifies by cooling, said connections are pressed into the grooves so as to be completely embedded in the resin in the grooves. By the above arrangement and procedures, it is possible to obtain stator coils shaped precisely to predetermined dimensions and free from any spring back, through extremely simplified procedures and with consequent low manufacturing cost, while the provision of the terminal structure on the coil end is particularly effective for achieving perfect insulation and fixing of the connections between the coil winding ends and the lead wires in an efficient manner through simple procedures. Thus disadvantages inherent in the conventional electrical machine stators and manufacturing methods therefor are substantially eliminated.

These and other objects and features of the present invention will become apparent from the following description taken in conjunction with preferred embodiment thereof with reference to the attached drawings in which.

Figure 27:
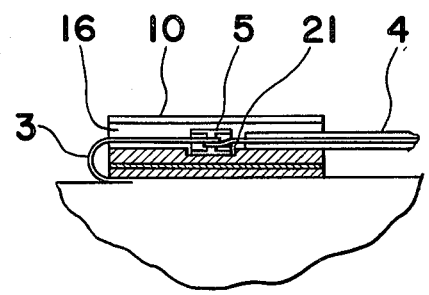
Figure 28:
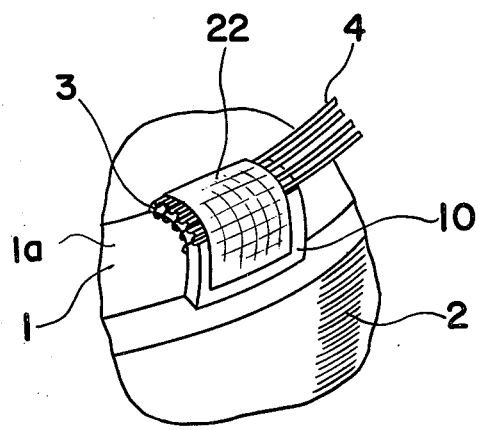

FIG. 27 is a fragmentary cross sectional view showing, on an enlarged scale, a recess for receiving the connections therein, which recess is formed in each of the grooves of the terminal structure; and FIG. 28 is a fragmentary perspective view of the coil end, and a terminal structure mounted thereon, explanatory of the final insulation and fixing of the connections between the coil winding ends and lead wires onto the terminal structure.

Before the description of the present invention proceeds, it is to be noted that like parts are designated by like reference numerals throughout several views of the accompanying drawings.

It should also be noted that in the description of the present invention hereinbelow, equipment and devices such as inserter machines, shaping machines, various molds, hot-melt resin applicator and the like described employed for the manufacturing of stators of the invention are those known in the art prior to the present application except for procedures and materials directly related to coil end finishing such as shaping and fixing of the coil end, formation of a terminal structure on the coil end, insulation and fixing of connections between coil winding ends and lead wires onto the terminal structure, and resinous materials employed for the coil and finishing, so that such conventional equipment and devices are not specifically shown in the accompanying drawings.

Figure 1:
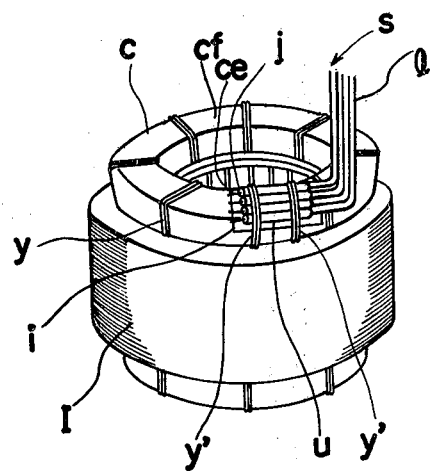
FIG. 1 is a perspective view of an electric motor stator produced by a conventional method.
Figure 2:
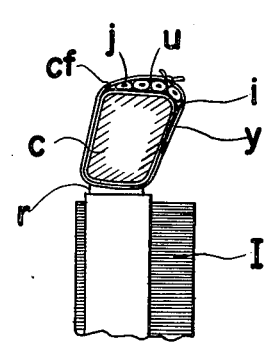
FIG. 2 is a transverse section of the stator of FIG. 1.
Figure 3:
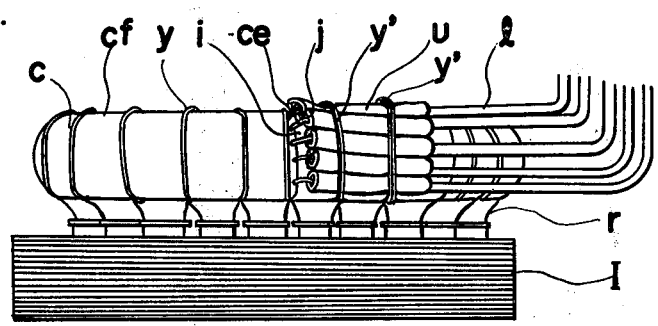
FIG. 3 is a side elevation view of the stator of FIG. 1.
Figure 4:
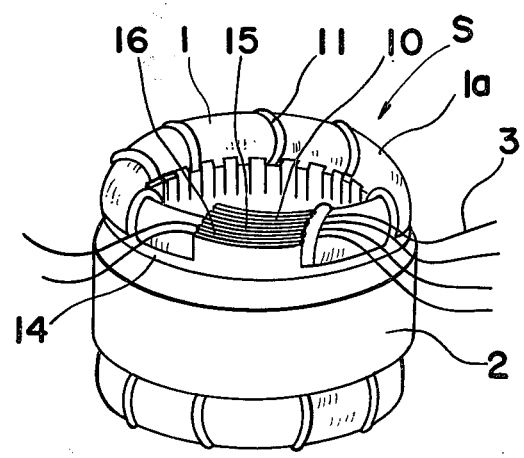
FIG. 4 is a perspective view of an electric motor stator which is removed from molds, after simultaneous formation of a terminal structure and a plurality of bands by moldable resin on a coil end according by a manufacturing method according to the present invention.
Figure 5:
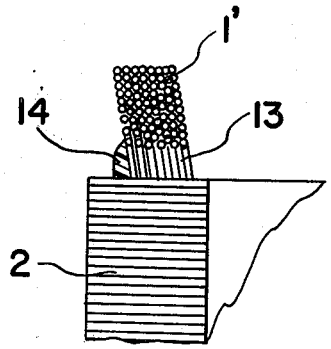
FIG. 5 is a fragmentary cross sectional view showing, on an enlarged scale, the construction of the coil end of the stator of FIG. 4.
Figure 6:
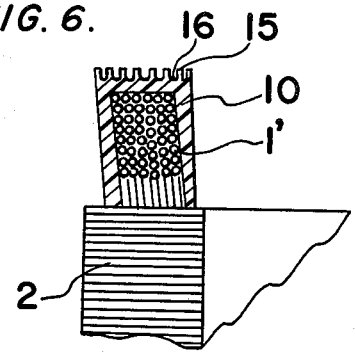
FIG. 6 is a fragmentary cross sectional view showing, on an enlarged scale, construction of the terminal structure of the stator of FIG. 4.

Referring now to FIGS. 4 to 6, there is shown in FIG. 4 an electric motor stator S produced by the method according to the present invention, which stator S has been removed from molds (not shown) after having had formed around the circular coil end 1a of a stator main coil 1 inserted in a cylindrical iron core 2, at the time of coil shaping, a plurality of spaced projections or bands 11 of moldable resin, and simultaneously having had formed thereon a terminal structure 10 of similar moldable resin, which band 11 and terminal structure 10 are described in more detail later. It is to be noted that, in FIG. 4, coil winding ends 3 of the stator coil 1 are not connected to lead wires (not shown) as yet. FIG. 5 is a cross section of a part of the stator of FIG. 4 showing the arrangement of coil wires 1' of the coil end 1a and a runner 14 of moldable resin on which the bands 11 for the coil end 1a are formed, which coil end 1a rises from the iron core 2 as shown at 13, while in FIG. 6, there is shown a cross section of the terminal structure 10 having a plurality of grooves 16 spaced from each other by corresponding partition walls 15 on the upper peripheral surface of the terminal structure 10, in which grooves 15, connections (not shown) between the coil winding ends 3 of the stator coil 1 and lead wires (not shown) are to be placed for insulation and fixing in a manner described later.

Figure 7:
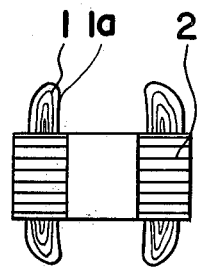
FIGS. 7 to 14 are schematic diagrams explanatory of a manufacturing process of an electric motor stator according to the method of the present invention.
Figure 8:
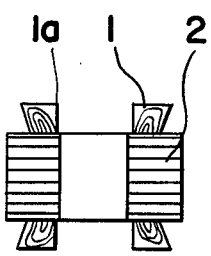
Figure 9:
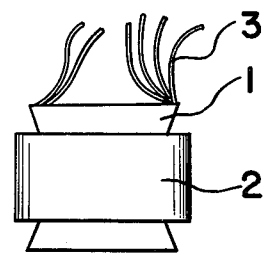
Figure 10:
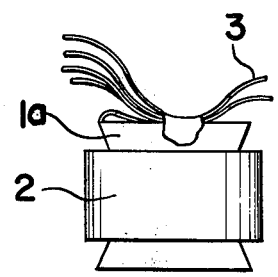
Figure 11:
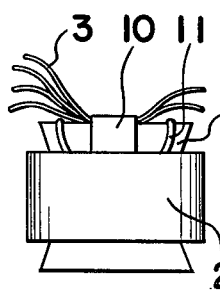
Figure 12:
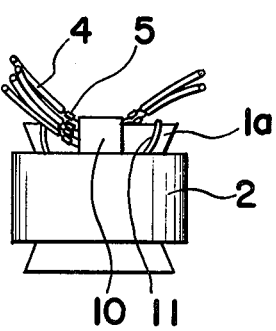
Figure 13:
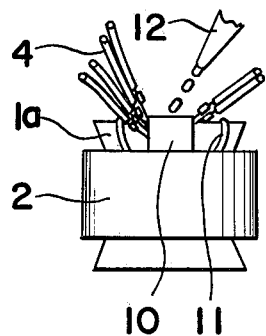
Figure 14:
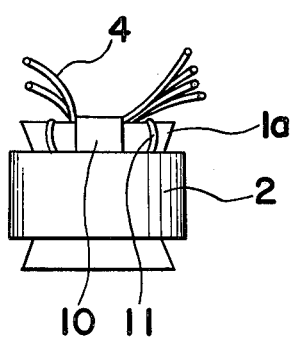

Referring now to FIGS. 7 to 14 showing schematically the steps in the manufacturing process of the electric motor strator according to the present invention, the coil end 1a of the main stator coil 1 inserted into the iron stator core 2 as shown in FIG. 7 by an inserter machine (not shown) and is shaped into a predetermined shape as shown in FIG. 8 through primary shaping by a shaping machine (not shown). Subsequently, the winding ends 3 of the coil 1 are strengthened for insulation through application of hot-melt resin (not shown) thereto as shown in FIG. 9, which application of the hot-melt resin may be dispensed with, if enameled wires constituting the winding ends 3 have sufficient dielectric strength. Subsequently, the winding ends 3 are secured at a predetermined position on the coil end 1a by the application, for example, of the hot-melt resin as in FIG. 10. The stator to which the winding ends 3 are temporarily fixed through the primary shaping mentioned above is then mounted on a final shaping machine (not shown), after which the internal wall and upper portion of the coil end 1a are clamped by a one-piece mold (not shown), with the external wall of the coil end 1a being further clamped by a split mold (not shown) to impart a predetermined dimension to the coil end 1a in a closed state. In this state, a nozzle (not shown) of an injection molder (not shown) for moldable resin is pressed against a gate (not shown) provided on a shaping mold (not shown) of the final shaping machine described above for injecting moldable resin into the coil end 1a under low pressures of 5 to 50 kg/cm², so that the terminal structure 10 and the bands 11 are formed, by the injected moldable resin on the coil end 1, with the coil end 1a being simultaneously set to the predetermined dimensions as shown in FIG. 11. Subsequently, the lead wires 4 are connected to the winding ends 3 of the coil end 1a on which the bands 11 and the terminal structure 10 are now formed with the moldable resin in the above described manner, in which procedure, the connections 5 between the lead wires 4 and the winding ends 3 are generally formed by soldering, but may be formed by caulking and the like. Following the above procedure, hot-melt resin for bonding and insulation are supplied under pressure into the grooves 16 (FIG. 6) of the terminal structure 10 through an applicator 12 to fill the grooves 16 as shown in FIG. 13, and before the hot-melt resin is hardened by cooling, the above described connections 5 are pressed into the grooves 16 to be perfectly embedded in the resin therein for effecting insulation and fixing of the connections 5, with the stator being consequently finished as shown in FIG. 14.

While the foregoing steps have been described in an extremely simplified manner, the shaping of the stator coil 1, the fixing of the coil end 1a and formation of the terminal structure 10 through injection of the hot-melt resin, the configuration of the terminal structure 10, and the insulation and fixing of the connections 5 between the winding ends 3 and lead wires 4, which are the most important processes of the present invention, will be described in more detail hereinbelow.

Figure 15:
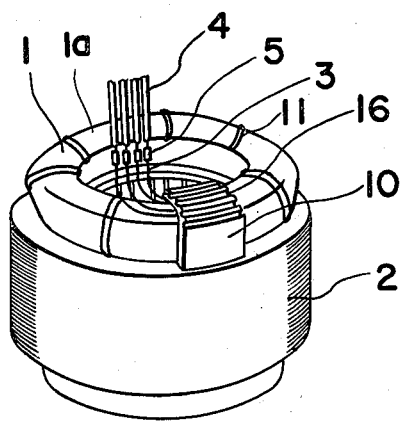
FIG. 15 is a perspective view of an electric motor stator manufactured according to the manufacturing method of the invention, showing the state thereof prior to embedding of connections between coil winding ends and lead wires in grooves formed in the outer periphery of the terminal structure.
Figure 16:
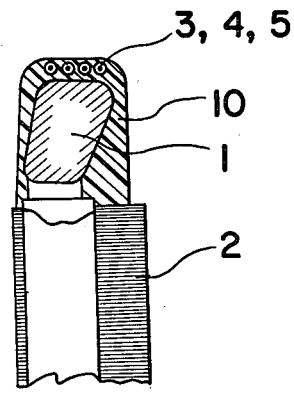
FIG. 16 is a fragmentary cross sectional view showing, on an enlarged scale, the terminal structure of FIG. 15, with the connections embedded in the grooves thereof.

Referring to FIGS. 15 and 16 the moldable resin employed in the above described processes should have sufficient endurance when the electric motor (not shown) is put into practical use, and simultaneously should be moldable at low pressure and low temperature so as not to damage the stator coil 1 during molding of the same. It is difficult to cause most of the low pressure molding materials to harden sufficiently due to the coolness of the stator coil 1, although some such materials have high fluidity as in epoxy resin. In the foregoing steps of FIGS. 7 to 14, a crystalline saturated polyester resin having a melt viscosity less than 200 poise at 200° C. and thermal stability for a long period of time is employed for effecting injection molding at low pressures of 5 to 50 kg/cm² at low temperatures of 150° to 180° C. It has been confirmed by the present inventors that if the temperature of the metal mold (not shown) is maintained at approximately 170° C., with a clamping hold time of the mold being kept for 2 to 3 minutes, crystallization of the resin proceeds to such an extent as to achieve sufficient strength, while if the clamping hold time is limited to no more than one minute for the molding, with the temperature of the metal being kept in the vicinity of room temperature, a terminal structure 10 of rubber-like properties having comparatively large elasticity is obtained due to insufficient crystallization in the structure 10. It is to be noted that the connections 5 between the coil winding ends 3 and lead wires 4 in FIG. 15 are more easily inserted into the grooves 16 of the terminal structure 10 when moldable resin having rubber-like properties is employed. It is also to be noted that the moldable resin should preferably be filled with fibrous or granulated filler to such an extent that such filler does not reduce the moldability of the resin in order to impart heat-resistance, improved mechanical strength and shock resistance to the moldable resin. Furthermore, it is possible to make the moldable resin incombustible by the addition of a flame retarding agent thereto.

The mold (not shown) for coil shaping which also serves as the mold (not shown) for molding the resin is provided with a heat-resistant elastic member (not shown) of silicon rubber or the like releasably attached to a portion thereof contacting the stator coil 1 for ensuring close contact between the coil end 1a which may have an indefinite shape and the mold. In the shaping of the coil 1, the internal diameter and height of the coil end 1a are carefully shaped to the predetermined dimensions during the primary shaping, while in the secondary shaping of the coil 1, importance is attached to forming the coil end 1a exactly into the predetermined dimensions through gradual clamping of the external periphery of the coil end 1a by a split mold (not shown). The runner 14 of the molded resin should preferably be formed at the outer circumference of the coil end rising portion 13 as is most clearly seen in FIGS. 4 and 5, since formation of the runner 14 at such a position is advantageous from the view point of low resistance to the moldable resin during its injection under pressure, and of insulation and reinforcement of the same portion. It is to be noted, however, that, depending on the type of stator, formation of such runner in the metal mold may result in saving of the moldable resin.

The dimensions of the bands or projections 11 formed in spaced relation to each other along the coil end 1a should be determined by the configuration of the coil end 1a, the diameter of the coil wires 1' (FIG. 5), the number of turns of the coil wires 1' and the number of poles of the stator. For example, in a stator for a small-sized electric motor having an output of less than one horsepower (Hp), formation of bands 11, each having a thickness less than 3 mm, at several places around the coil end 1a is sufficient to achieve rigid fixing of the stator coil 1. It should be noted here, however, that if the stator coil 1 thus fixed is greatly deteriorated through vibration thereof for a long period of time in cases where the stator coil 1 has a large spring back or when such stator coil is employed in an electric motor which is frequently stopped or started in actual use, self-fusing wires should be employed for achieving fixing between wires, in which case, the stator coil 1 mounted in the secondary mold (not shown) for shaping is heated by passing electric current therethrough so as to raise the temperature of the self-fusing wires up to a predetermined level for bonding therebetween with subsequent injection of the moldable resin into the stator coil 1 to form the terminal structure 10 and the bands 11 on the coil end 1a. In the above described process, if the moldable resin is injected into the stator coil 1, with the same stator coil being kept at a temperature over 100° C., bonding between the stator coil 1 and the moldable resin is substantially improved, and consequently, the terminal structure 10 and the bands 11 are rigidly secured to the coil end 1a. It is unnecessary to say, however, that the passing of the electric current through the stator coil 1 for the above described fusing purpose may be more readily effected after the lead wires 4 have been connected to the coil winding ends 3, with the connections 5 therebetween having been fixed to the terminal structure 10. What is to be noted here is that such a terminal structure 10 should be so constructed as to allow the connections 5 between the coil winding ends 3 and the lead wires 4 to be fixed on the surface of the terminal structure 10 for insulation and fixing of the connections 5 as shown in FIG. 16. In the steps of FIGS. 4 to 14, grooves 16 sufficiently large for the connections 5 to be embedded therein are formed on the upper surface of the terminal structure 10, with the partition plates 15 being formed between the neighboring grooves 16, for receiving the connections 5 without any insulating material in the grooves 16 as is seen in FIGS. 15 and 16.

It should be noted here that in order to rigidly secure the terminal structure 10 to the coil end 1a, the formation of the structure 10 on the coil end 1a through direct injection molding as described above is preferable, but that such a terminal structure may be separately formed by moldable resin or the like in advance, with subsequent mounting of the previously molded structure 10 onto the coil end 1a by an automatic machine (not shown), for thereafter securing the structure 10 onto the coil end 1a by the application of an adhesive or through fusion of the contacting portions of the structure 10 and the coil end 1a, which latter process will be described in detail hereinbelow.

Figure 17:
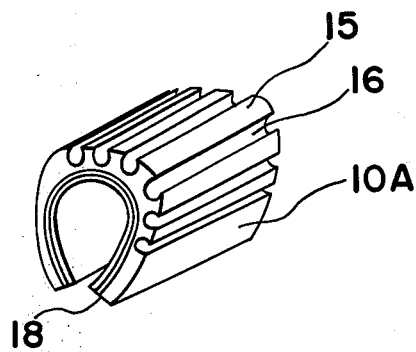
FIG. 17 is a perspective view showing, on an enlarged scale a separately formed terminal structure according to the manufacturing method of the present invention.
Figure 18:
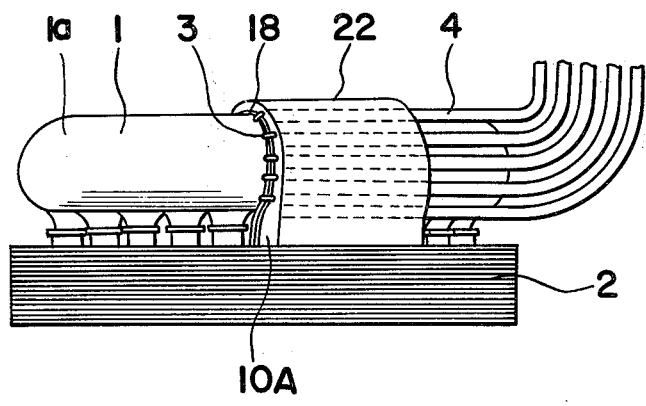
FIG. 18 is a side elevational view of a coil end on which the terminal structure of FIG. 17 is mounted, with the connections between the coil winding ends and lead wires having been embedded in the grooves of the terminal structure.

Referring now to FIGS. 17 to 23, there is shown in FIG. 17 a separately formed terminal structure 10A of substantially saddle-like shape having a layer 18 of elastic material embedded in its inner surface, and also having a plurality of grooves 16, with corresponding partition walls 15 therebetween, which grooves 16 and partition walls 15 extend axially of the terminal structure parallel to each other in the upper peripheral surface of the structure 10A. The configuration of the elastic material layer 18 should be such that, upon mounting of the terminal structure 10A onto the coil end 1a of the stator coil 1 as shown in FIG. 18, the layer 18 firmly grips the coil end 1a, and is properly pressed against the coil end 1a when the inner surface of the structure 10A contacting the coil end 1a is fused by passing of electric current through the stator coil 1 as described earlier. The terminal structure 10A having the elastic material layer 18 embedded therein as described above is mainly for application to a stator of comparatively small size, and is effective for mass production of stators having a coil end external diameter under 100 mm. In FIG. 18, the connections 5 (FIG. 15) between the coil winding ends 3 and the lead wires 4 are inserted into the grooves 16 (FIG. 17) of the terminal structure 10A which is mounted on the coil end 1a in the above described manner, with subsequent covering of the outer periphery of the structure 10A by a sheet 22 of nonwoven fabric impregnated with hot-melt resin, after which procedure, a heated metal mold (not shown) is pressed against the sheet 22 to fuse the hot-melt resin for integrally fixing the connections 5 to the terminal structure 10A.

Figure 20:
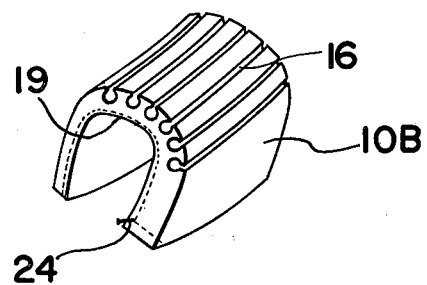

In FIG. 20, there is shown another modification of the terminal structure 10A of FIG. 17. In this modification, the elastic material layer 18 described as employed in the terminal structure 10A of FIG. 17 is replaced by a layer 19 of low melting point hot-melt resin on the inner surface of the terminal structure 10B directly contacting the coil end 1a, which layer 19 preferably has good adherence to the coil end 1a and is adapted to melt at a lower temperature than the outer surface of the structure 10B, particularly the outer surface thereof in which the connections 5 are to be embedded.

Figure 19:
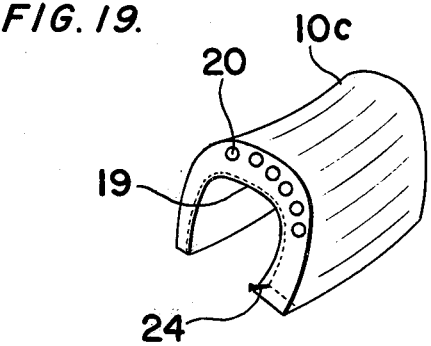
FIGS. 19 to 21 are views similar to FIG. 17, but particularly showing modifications thereof.

In a further modification 10C of the terminal structure 10B of FIG. 20 as shown in FIG. 19, the grooves 16 in the structure 10B are replaced by a plurality of through-openings or bores 20 axially formed in parallel relation to each other in the upper peripheral portion of the terminal structure 10C.

It is to be noted here that the low melting point hot-melt resin described as employed for the layers 19 of the structures 10B and 10C of FIGS. 20 and 19 may of course be utilized as a resin for covering the connections 5 inserted in the grooves 16 or bores 20, in which case, working efficiency is appreciably improved, since any deformation or distortion of the terminal structures can be prevented in the fusing and fixing operations for insulating and securing the connections 5 to the terminal structures.

Still referring to FIGS. 20 and 19, in each of the terminal structures 10B and 10C, a terminal wire 24 extends outwardly from one side edge of the structure, which terminal wire 24 is connected to a heater element (not shown) which is embedded in the structure 10B or 10C in a portion thereof adjacent to the coil end 1a, and upon passing electric current through the terminal wire 24, the heater element is heated to fuse the layer 19 of low melting temperature hot-melt resin at the inner surface of the structure centacting the coil end 1a, the terminal structure thus being secured to the coil end 1a as the hot-melt resin hardens when the flow of electric current is suspended.

Figure 21:
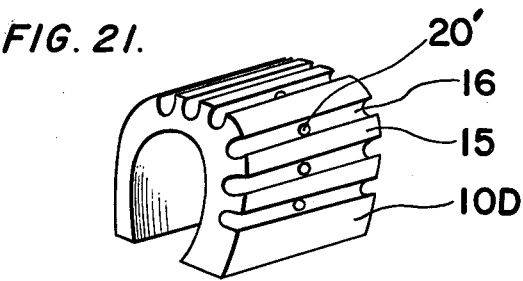
Figure 22:
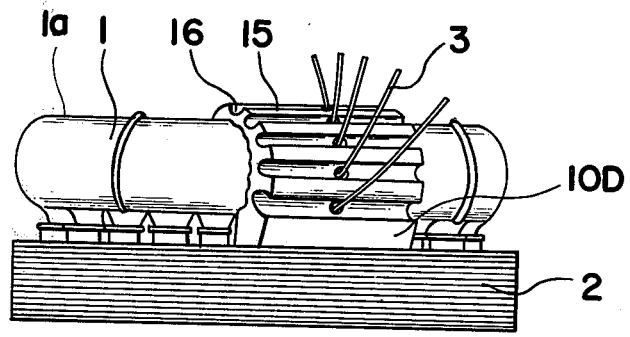
FIG. 22 is a side elevation view of a coil end on which the terminal structure of FIG. 21 is mounted, with coil winding ends having been drawn out through openings formed in the grooves of the terminal structure.
Figure 23:
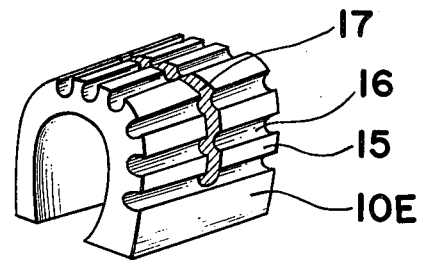
FIG. 23 is a view similar to FIG. 21, but particularly showing a further modification thereof.

Reference is made to FIGS. 21 to 23 showing further modifications of the terminal structure 10B of FIG. 20. In the modification of FIG. 21, the terminal structure 10D is provided with a plurality of radial, with respect to the stator coil axis, through-openings 20′, each formed in the central portion of the groove 16, for drawing out the corresponding coil winding end 3 therethrough as shown in FIG. 22, by which arrangement, the connections 5 (FIG. 15) between the coil winding ends 3 and the lead wires 4 are more rigidly fixed to the terminal structure 10D. In the modified terminal structure 10B shown in FIG. 23, the through-openings 20′ described as employed in the structure 10D of FIG. 21 are replaced by a radial slit or cut-out portion 17 formed in the central portion of the peripheral surface of the structure 10E in a direction normal to the grooves 16, through which slit 17 the coil winding ends 3 can be drawn out in a similar manner to that described with reference to FIG. 21.

For insulating and fixing the connections 5 between the coil winding ends 3 and the lead wires 4 to the terminal structure when the connections 5 are inserted into the grooves 16 or openings 19 (FIG. 20), procedures as follows may be employed depending on the requirements.

(i) Embedding the connections 5 in the grooves 16 preliminarily filled with the hot-melt resin which is injected into the grooves 16 from outside as described earlier.

(ii) Dripping the resin from outside into the grooves 16 or openings 20 in which the connections 5 have preliminarily been inserted, and (iii) Enclosing the connections 5 in a metal mold into which the resin is injected for securing the connection 5 to the terminal structure.

Figure 24:
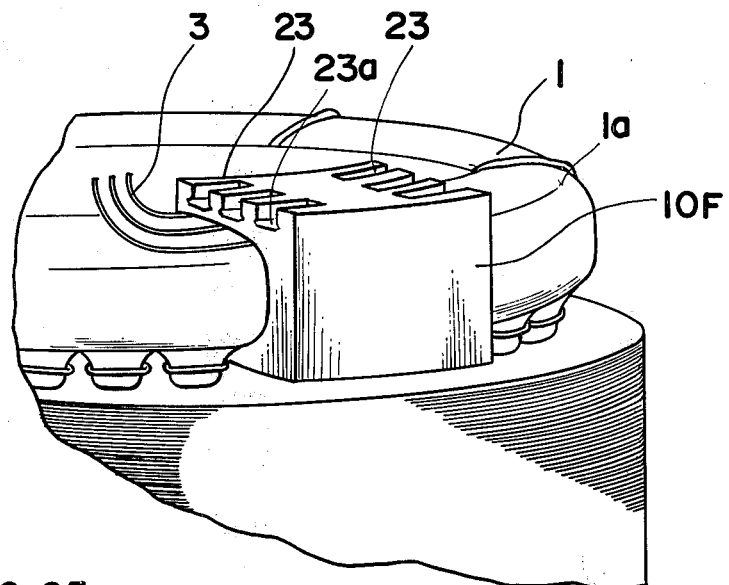
FIGS. 24 and 25 are perspective views showing, on an enlarged scale, the coil end on which a terminal structure having metallic terminals according to the manufacturing method of the invention is mounted.
Figure 25:
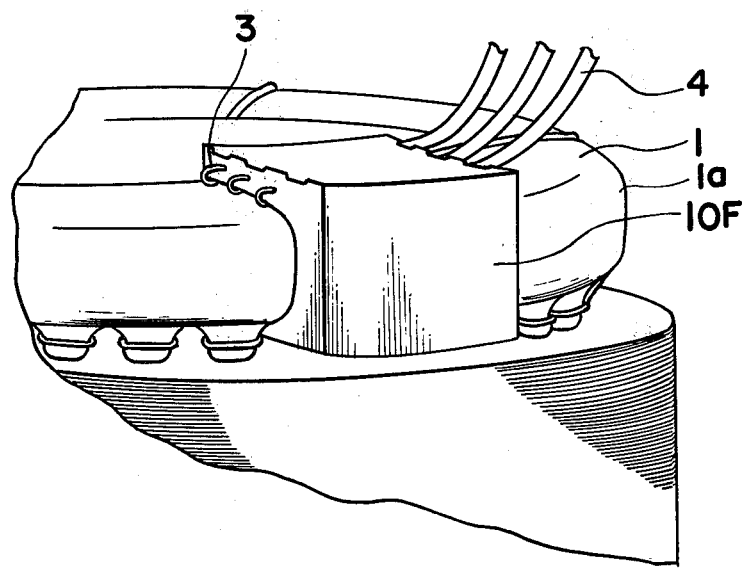

Reference is had to FIGS. 24 and 25 showing still further modifications of the terminal structure of FIG. 17 and applications thereof to the coil end 1a of the stator coil 1. In FIG. 24, the terminal structure 10F having a cubic box-like configuration has the inner surface closely fitting around the coil end 1a, with a plurality of opposed recesses 23 being formed in opposite end edges, in the direction of the coil axis, of the upper surface thereof as shown, in each of which recesses 23 a metallic terminal plate 23a which extends to the corresponding recess of the other end of the terminal structure is directly mounted. In this arrangement, each of the coil winding ends 3 is connected to one end of the terminal plates 23a, while each of the corresponding lead wires is connected to the other end of the corresponding terminal plate 23a for subsequent insulation and fixing by resinous material as shown in FIG. 25. It is to be noted that the structure 10F of FIG. 24 may further be modified in such a manner that each of the lead wires 4 is preliminarily connected to one end of the metal terminal 23a of the separately formed terminal structure, and after the terminal structure is fixed to the coil end 1a, the coil winding ends 3 are connected to the other ends of the terminal plates 23a.

Figure 26:
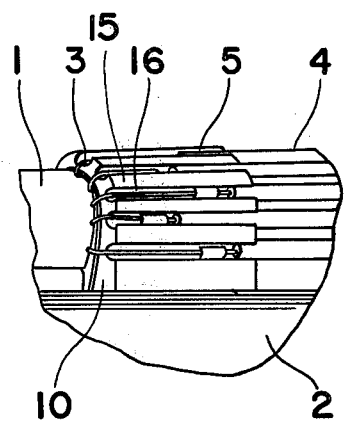
FIG. 26 is a fragmentary perspective view showing, on an enlarged scale, an arrangement of the connections between the coil winding ends and lead wires in the grooves of a terminal structure mounted on the coil end according to the manufacturing method of the present invention.

Reference is made to FIGS. 26 and 27 showing modifications of arrangement of the connections 5 in the grooves 16. In FIG. 26, the connections 5 in the grooves 16 of the structure 10 are alternately offset along the length of the grooves as shown, which arrangement is effective for obtaining perfect insulation even when the partition wall 15 between the grooves 16 is not sufficiently thick, and also for preventing damage to the grooves 16 or the partition walls 15 of the elastic terminal structure by projections (not shown) on the connections 5. In FIG. 27, each of the grooves 16 of the terminal structure 10 is provided with a recess 21 therein so as to increase the depth of the groove 16 for receiving in the recess 21 the connection 5 which has a somewhat larger dimension than the groove in the direction of the depth of the groove by which arrangement not only is the positioning of the connections 5 in the grooves 16 readily effected but deformation of the grooves 16 is advantageously prevented.

In FIG. 28, there is shown another modification for insulating and fixing the connections 5 onto the outer surface of the terminal structure 10, which method is similar to the one described with reference to FIG. 18, but is applicable irrespective of the presence of the grooves 16 or openings 20 in the outer peripheral surface of the terminal structure 10. In this modification, a material 22′ impregnated with hot-melt resin is applied over the connections 5 on the terminal structure 10 as shown, which material 22′ is subsequently heated under pressure for insulating and fixing the connections 5 onto the structure 10. The material 22′ for impregnation with the hot-melt resin should preferably be a nonwoven fabric or cloth of polyester or glass fibers.

As is clear from the foregoing description, according to the present invention, shaping of the stator coil which has conventionally been carried out by three to four modifications by molds so as to obtain the predetermined dimensions is effected merely by fixing the stator coil while the stator coil is clamped to predetermined dimensions within the shaping mold, by which arrangement, not only is deformation of the stator coil due to its spring back eliminated, but stator coils shaped to the predetermined dimension can be obtained at low manufacturing cost. Furthermore, provision of a terminal structure formed simultaneously with the coil shaping is quite effective for carrying out the insulation and fixing of the connections between the coil winding ends and the lead wires in an extremely short period of time, so that marked reduction of the manufacturing cost which can hardly be achieved by the conventional method employing tying threads is advantageously achieved. Moreover, simultaneous employment of self-fusing wires in the present invention completely eliminates the varnish treatment, thus further contributing to reduction of the manufacturing cost, while reduction of the insulation in the stator in a high humidity atmosphere experienced in conventional stators mainly due to deterioration of the connections between the coil winding ends and the lead wires is completely prevented by embedding the connections in the terminal structure with a humidity-resistant resinous material, with consequent marked improvement of the stators from the view point of electrical performance.

Described below is a series of experiments according to the present invention carried out by the present inventors.

(Experiment I) (equivalent to arrangements in FIGS. 7 to 14)

The experiment was effected in the winding process of a stator for a two-pole 200 W electric motor, which stator had an iron core external diameter of 140$\phi$, a main coil wire diameter of 0.9$\phi$ and an auxiliary coil wire diameter of 0.75$\phi$.

Firstly, the main coil and auxiliary coil were simultaneously inserted into the iron core slot by an automatic coil inserter machine (not shown), after which the coil end 1a was shaped to the predetermined dimensions, which were close to 70% of the final finishing dimensions, by a primary shaping machine (not shown). After wires connected between the poles (not shown) and the coil winding ends 3 had been cut to predetermined lengths, the entire coil end 1a was immersed into liquid hot-melt resin at approximately 100° C., which resin was prepared from saturated polyester resin having a low viscosity of 50 poise at 200° C., after which the coil end 1a was taken out of the liquid, with subsequent removal of excessive resin therefrom before cooling, thus a resin film (not shown) of approximately 0.3 mm was formed on the coil end 1a. The wires for connecting the poles and coil winding ends 3 thus strengthened for insulation were then inserted into predetermined positions of the coil end 1a, and temporarily fixed to the coil end 1a by the above described hot-melt resin, for which a commercially available hot-melt resin applicator was employed as the applicator 12 for the hot-melt resin, and the ammount of the hot-melt resin discharged by dripping from the applicator 12 was readily adjustable by regulation at the nozzle thereof. Subsequently, the stator coil 1 which had been subjected to the primary shaping and temporary fixing of the coil winding ends 3 thereto was mounted on a secondary shaping machine (not shown) for being clamped by and enclosed in the mold thereof (not shown) so as to have predetermined dimensions, after which a moldable resin fused at 180° C. was injected into the mold for about five minutes under a pressure of approximately 40 Kg/cm² through the resin injection gate (not shown) provided on the secondary shaping mold (not shown), with the amount of resin injected being approximately 40 g. After a clamping hold time of approximately 60 seconds, the mold was broken, and five equally spaced bands 11 and a terminal structure 10 having six grooves 16 therein was thereby formed on the coil end 1a. The moldable resin employed in the above described process was saturated polyester resin having a viscocity of about 50 poise at 200° C. and used for the earlier mentioned insulation strengthening of the coil winding ends 3, with glass fibers (not shown) of approximately 10μ in diameter and 3 mm in length surface-treated with vinylsilane having been added to the polyester resin by five PHR for strength improvement which mixture of the polyester resin and glass fibers had a viscocity of approximately 200 poise at 200° C. After soldering the lead wires 4 to the coil winding ends 3 of the stator obtained in the above described manner, the connections 5 therebetween were placed in the grooves 16 of the terminal structure 10, into which the hot-melt resin employed for the earlier described insulation strengthening of the coil winding ends 3 was applied by dripping for filling the grooves 16. In several minutes, the fused hot-melt resin was solidified by cooling, with the connections 5 thus being insulated and fixed. The fixing of the lead wires 4 of the stator attained in the above described manner was much stronger than that obtained by the conventional varnish treatment. Furthermore, for testing insulation resistance between the iron core and stator coil in a humid atmosphere, the stator produced according to the method of the present invention and that by a conventional method were left for five days at conditions of 40° C. and 100% RH in relative humidity for comparison of saturation values therebetween, and it was found that the insulation resistance of the conventional stater was reduced to $10^7$ Ω, whereas that of the stator according to the present invention remained at $10^9$ Ω and the electrical performance of the connections 5 of the latter was superior to the former.

(Experiment II) (equivalent to arrangements of FIGS. 7 to 16)

The experiment was carried out in the winding process for a making a stator for a four-pole 180 W electric motor, which stator had an iron core external diameter of 140 φ and a main coil wire diameter of 0.6 φ, while self-fusing wires of 0.55 φ and 0.35 φ were employed for the auxiliary coils.

Firstly, the main coil was inserted into the iron core by a coil inserter machine (not shown), and subsequently the auxiliary coils (not shown) were sequentially inserted thereinto, after the coil end 1a had been shaped to the predetermined shape through widening of the slot (not shown). After the stator coil 1 was shaped to the pedetermined shape by a secondary shaping machine (not shown), the wires (not shown) for connecting the poles and a coil winding ends 3 were immersed in the fused hot-melt resin for insulation strengthening, with subsequent temporary fixing of the coil winding ends 3 to their predetermined position by the hot-melt resin. The stator thus prepared was then mounted on a third shaping machine (not shown), with the stator coil 1 being by and enclosed in the mold thereof (not shown) so to have the predetermined final dimensions, while, the coil winding ends 3 were left projecting out of the mold. The coil winding ends 3 were subsequently connected to an electric heating device (not shown) for applying predetermined voltages to each of the coils, with excess current being passed through the coils for approximately thirty seconds to raise the coil temperature up to 170° C. Thereafter, a moldable resin was injected under pressure into the mold through the resin injection gate (not shown) provided on the shaping mold for the formation of the terminal structure 10 at the predetermined position on the coil end 1a. The above described moldable resin had a viscosity of approximately 3000 poise in the fused state at 200° C. and contained granular filler of about 10 PHR, and was injected into the mold under a pressure of 50 kg/cm² at 150° C. After aproximately three minutes of hold time with the mold clamped, the mold was broken for taking out the stator. The temperature rise of the coil due to the electrical heating was absorbed by the iron core 2, with the coil and the terminal structure 10 being cooled to below 70° C. to give it sufficient strength. After the lead wires 4 had been connected to the coil winding ends 3, the connections 5 therebetween were placed in the grooves 16 formed in the terminal structure 10, after which a heated plate member (not shown) was brought into contact with the grooves 16 so as to fuse and close the grooves 16 for insulation and fixing of the connections 5. In the stator obtained in the above described method of the invention, the fixing of the stator coil 1 and the lead wires 4 was fully satisfactory, with the procedures required for the conventional methods being simplified to a large extent.

[Experiment III] (equivalent to arrangements in FIGS. 7 to 16)

The experiment was carried out employing the same kind of electric motor stator as that described with reference to Experiment I. After the lead wires 4 had been soldered to the coil winding ends 3, a mixture of hot-melt saturated polyester resin having a viscosity of 90 poise at 200° C., a melting point of 165° C., a dielectric strength over 20 kv/mm and a tensile strength over 80 kg/cm$^2$ at normal temperatures, and having therein glass fibers of 5 PHR, was injected under low pressure onto a predetermined portion of the stator coil 1 with the use of a metal mold (not shown) to form a terminal structure having a predetermined number of grooves 16, into which grooves the earlier mentioned connections 5 were inserted. Thereafter, the above described saturated polyester resin (having no glass fibers therein) at 200° C. was applied under pressure into the grooves 16, and then cooled to room temperatures for solidification. The lead wires thus fixed required a force of over 15 kg to separate them from the terminal structure, which was equivalent to or greater than the resistance of lead wires fixed by the conventional method employing tying threads and varnish treatment. Thus the connections 5 for the lead wires were prefectly fixed, and had improved humidity-resistance and insulation, which favorable effects are mainly attributable to the provision of the terminal structure 10 of the moldable resin and complete embedding of the connections 5 in the grooves 16 through application of the hot-melt resin under pressure into the grooves 16 in which the connections are preliminarily placed. In the above procedure, since the compositions of the resins for the terminal structure and for fixing the connections 5 are approximately the same, with proper compatibility therebetween, sufficient bonding effect can be expected.

[Experiment IV] (equivalent to arrangements of FIGS. 17 and 18)

In this experiment, glass fiber reinforced polybutylene therphthalate resin was molded, by an injection molding machine, into the elastic member 18 having a saddle-like configuration with a thickness of 1 mm for closely gripping the coil end 1a. Subsequently, the moldable resin composed of the saturated polyester resin having a melting point of 105° C. and a viscosity of 65 poise at 200° C., and having glass fibers of 10μ in diameter and 6 mm in length added thereto by 5 PHR was molded by the injection molding machine (not shown) onto the outer surface of the elastic member to form the separate terminal structure 10A having the grooves 16 thereon. On the other hand, the electric motor stator employed for this experiment was similar to that described with reference to Experiment I, with the stator coil 1 being formed by self-fusion wires treated by a fusion bonding agent mainly of phenoxy resin and insulation enamel of polyester amide, which stator coil was inserted into the slot (not shown) of an iron core 2 by the inserter machine (not shown). Subsequently, the coil end 1a was shaped to predetermined dimensions, with the shape of the windings thereof properly arranged, after which the terminal structure 10A was mounted on the coil end 1a by spreading the corresponding portions of the saddle-like elastic member 18 apart and was then clamped thereto. Thereafter, the coil winding ends 3 were connected to vinyl-coated lead wires by caulking of pressing terminals (not shown), with the connections therebetween then being inserted into respective grooves 16. Subsequently, the lead wires 4 were connected to an electric heating source (not shown), with a coil end 1a being disposed in the split mold (not shown) for pressing the stator coil 1 so that it is perfectly integrated. Since the terminal structure 10A firmly holds the coil end 1a through the elastic member 1S incorporated therein, it is unnecessary to apply any external pressure to the structure 10A. Accordingly, the pressure from the mold (not shown) was not applied to this particular portion, and the lead wires 4 for electrical heating were left projecting out of the same portion. Subsequently, electric current was passed through he lead wires 4 and the stator coil 1 for two minutes to raise the temperature of the stator coil up to 190° C., so that the self-fusion wires were sufficiently fixed to become perfectly integral, while the contacting faces between the terminal structure 10A and the coil end 1a were fused so as to be sufficiently soft for the structure 10A to rigidly adhere to the coil end 1a after cooling. After the stator had been cooled, the metal mold (not shown) was removed, and thereafter, the fused hot-melt resin was applied, through a nozzle gun for a commercially available hot-melt adhesive applicator, into the grooves 16 in which the connections 5 for the lead wires 4 had been inserted. In the above described manner, the grooves 16 were completely closed by the hot-melt resin, and the insulation and fixing of the connections 5 for the lead wires 4 were thus completed.

[Experiment V] (equivalent to arrangements of FIGS. 17 and 18)

In this Experiment, two stators were prepared, i.e., one having a stator coil wound with the self-fusion wires like those in Experiment IV and bound by tying threads, with subsequent impregnation of the stator coil through dripping of epoxy solventless varnish thereto, which was then gelled by electrical heating, and the other having a stator coil wound with polyester-coated wires, which stator coil, after having been heated by passing electric current therethrough, was coated by epoxy powdered resin by spraying for subsequent gelation. Immediately after the saturated polyester resin fused at 200° C. was applied by dripping onto each of the coil ends 1a of the two stators, a saddle-shaped terminal structure like that shown at 10A in FIG. 14 and incorporating therein an elastic member similar to that employed in Experiment IV was clamped and fixed to each of the coil ends by solidification. Subsequently, the coil winding ends 3 for each of the coil ends were cut to a predetermined length, and then connected to the vinyl-coated lead wires 4 through caulking of the pressing terminals (not shown). Thereafter, the connections 5 for the lead wires 4 of each of the coil ends 3 were placed in the grooves 16 of the respective terminal structures 10A, and then the grooves 16 were completely closed as in Experiment IV by the application of hot-melt resin under pressure through the nozzle gun (not shown) into the grooves 16, with portions of the coil winding ends 3 rising from the respective coil ends being also coated with the hot-melt resin for fixing such portions of the coil winding ends to the coil ends, thus insulation and fixing of the connections 5 for the lead wires being completed simultaneously, with consequent marked simplification of the process involved in the insulation and fixing of such connections.

[Experiment VI] (equivalent to arrangements of FIGS. 19 and 20)

After slot insulation was effected in a stator iron core of a 200 W induction motor, the stator coil was disposed in the iron core, with subsequent connection of the coil winding ends 3 and the lead wires 4 by pressing against each other. Thereafter, the connections 5 for the lead wires 4 were inserted into the grooves 16 of the terminal structure 10B of U-shaped cross section which was made of a saturated polyester resin having a melting point of approximately 170° C. and was provided with six grooves 16 on the peripheral surface thereof for insertion of said connections 5 therein and in which a heating element of carbon cloth was embedded in the resinous layer adjacent to the U-shaped inner surface thereof, with a terminal 24 for passing electric current through the heating element extending outwardly from one edge of the structure 10B. The terminal structure thus arranged was then mounted on the coil end 1a of the stator coil 1, after which, the electric current was supplied to the heating element through the terminal 24 for approximately 10 seconds until the temperature of the heating element reached 180° C. Subsequently, fused hot-melt resin of the same composition as that of the terminal structure 10 was poured into the grooves 16 of the terminal structture 10. The fixed portions of the lead wires of the stators were found to be sufficiently rigid, with superior insulation. It is to be noted that in the above described manufacturing process according to the present invention, the manufacturing cost was substantially reduced, as compared with that involved in the conventional manufacturing process.

[Experiment VII] (equivalent to FIGS. 21 and 22)

A terminal structure 10D which was provided with a plurality of grooves 16, each having a diameter of 2.5 mm $\phi$, at the outer peripheral surface thereof and also having an opening 20' having diameter of 2.5 mm $\phi$ at the bottom of each of the grooves 16 was preliminarily prepared from a hot-melt saturated polyester resin having a 200° C. melting point and a viscosity of 100 poise at the fusion point of 165° C. by an injection molding machine (not shown). The above described resin had sufficient fluidity at high temperatures and could be molded at an extremely low pressure, i.e. under 50 kg/cm$^2$ at temperatures over 150° C., while the same resin had a long life under a high temperature of 120° C., and had superior adhesive strength, flexibility and mechanical strength. Such hot-melt resin was particularly characterized in that the injection pressure and time for hardening or setting-up could be greatly reduced from the viewpoint of working efficiency, as compared with moldable thermosetting resin, and that such hot-melt resin could also serve as a hot-melt adhesive if the surface thereof was fused by heating. In the step that followed, the main stator coil and auxiliary coil were combined to form, with self-fusion wires, a coil having coil winding ends 3, which coil was inserted into the iron core, while the coil winding ends 3 drawn out of different slots (not shown) were combined at a position along the coil end 1a, and then drawn out through the openings 20' of the above mentioned terminal structure 10D to permit the terminal structure to fit into close contact with the coil end 1a. The coil winding ends 3 thus drawn out of the openings 20 were each cut to a length of 15 mm from its root portion and connected with the lead wires through caulking of the pressing terminals. The connections 5 for the lead wires thus formed were each pressed into the grooves 16. The stator which was not integrally fixed at this stage was then disposed in a metal mold (not shown) for shaping the coil end 1a and the terminal structure 10D to uniform dimensions, which metal mold was capable of applying pressure to external and internal peripheries of the coil end 1a by a split-mold (not shown) through hydraulic pressure, and also capable of pressing against the side walls of the terminal structure 10D through silicon rubber (not shown), while closing the same structure 10D at the upper portion thereof, and was further provided with a gate (not shown) for injecting the hot-melt resin at the upper portion thereof, with the lead wires extending out of the mold through a gap (not shown) in the silicon rubber. Subsequently, the lead wires were connected to the power source (not shown) for heating the coil 1 so as to fusion bond the self-fusion wires themselves, and also the contacting surfaces between the coil end 1a and the terminal structure 10D. Simultaneously, the hot-melt resin was injected onto the upper periperal surface of the terminal structure 10D for completely filling the spaces between the connections 5 and the grooves 16. In the above described procedure, the coil was heated, by the passage of the electric current, up to temperature of 180° C. for one to two minutes, under which condition, the stator coil and the terminal structure were integrally joined with each other, while a material modified from phenoxy resin by stabilized isocyanate was employed as the fusion-bond coating for the self-fusion wires, which material was adapted to cause fusion-bonding between the wires through heating at temperatures over 150° C. When the stator was removed from the metal mold after two to three minutes, no loose wires were noticed in the passage up to the terminal structure 10D, with the connections 5 for the lead wires and the stator coil being perfectly integral, thus superior insulation and fixing being advantageously achieved. The resistance of the lead wires to being pulled out of this stator was over 10 to 15 kg, which is more than that for lead wires fixed by the conventional method employing a tying threads and a varnish treatment. It is also to be noted that in the above described manufacturing method according to the invention, the procedures involved therein were much simpler than the conventional procedures, with consequent reduction of the manufacturing cost.

[Experiment VIII] (equivalent to arrangements in FIGS. 21 and 22)

In a similar manner to that in Experiment VII, a terminal structure 10D preliminarily molded from a hot-melt resin was mounted on the stator wound with self-fusion wires, while the coil winding ends 3 which were drawn out through the openings 20 were connected with the lead wires and then placed into the grooves 16. After setting the coil end 1a and the terminal structure 10D in a metal mold (not shown) for shaping the same to uniform dimensions, a electric current was passed through the stator coil for fusion-bonding of the self-fusion wires themselves, and also between the coil end and the terminal structure. After the stator thus treated was removed from the metal mold (not shown), fused hot-melt resin was poured through a nozzle around which a heating element (not shown) was wound and into the grooves 16 wherein the connections 5 for the lead wires had been inserted, whereby insulation coating of the connections 5 and fixing of the terminal structure 10D were completed simultaneously. The above described method of the invention is characterized in that the same requires a less precise metal mold than that employed in Experiment VII, thus further simplification of the process being achieved.

As is clear from foregoing description, according to the electrical machine stator and manufacturing method therefor according to the present invention, stator coils shaped and fixed to the predetermined dimensions can be obtained by a greatly simplified process in an efficient manner and with consequent low manufacturing cost, while the connections between the coil winding ends and the lead wire are perfectly insulated and fixed in a very short period of time by the provision of the terminal structure integrally formed with the coil end or separately formed for fixing to the coil end, so that disadvantages in the conventional electrical machine stator and the manufacturing method therefor such as the spring back of the stator coil, reduction of the insulation of the stator mainly due to deterioration of the connections between the coil winding ends and lead wires, troublesome procedures for binding coil ends and the connections for the lead wires with tying threads and the like are advantageously eliminated, with simultaneous reduction of the manufacturing cost to a large extent.

It should be noted here that, although the present invention is mainly described with reference to a stator of an electric motor in the foregoing description, the concept of the present invention is not limited, in its application, to the electric motor, but may be readily applicable, through by minor alterations, to many other electrical devices such as an electric generator, transformer or the like wherein shaping and fixing of coil windings, or perfect insulation and fixing of connections between coil winding ends and lead wires are required.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A stator assembly for use in an electrical machine which comprises:
   a core member;
   a coil element inserted in said core member having at least one of the coil ends of said coil element extending outwardly from a corresponding end of said core member, said one of said coil ends having coil winding ends extending out of it and connected to lead wires for an external power source; and
   a terminal structure constituted by a moldable resin mounted directly on said one of said coil ends to straddle said one of said coil ends having a plurality of band members integrally formed therewith for surrounding said one of said coil ends and having the connections between said coil winding ends and the lead wires for an external power source embedded therein for insulating and fixing the connections thereon.

* * * * *